United States Patent [19]

Bos

[11] Patent Number: 4,900,333
[45] Date of Patent: Feb. 13, 1990

[54] METHOD OF CARRYING OUT A GAS COMBUSTION PROCESS WITH RECOVERY OF A PART OF THE HEAT PRESENT IN THE COMBUSTION GASES

[75] Inventor: Hugo T. P. Bos, Zutphen, Netherlands

[73] Assignee: VEG-Gasinstituut N.V., Wilmersdorf, Netherlands

[21] Appl. No.: 98,524

[22] Filed: Sep. 18, 1987

[30] Foreign Application Priority Data

Sep. 23, 1986 [NL] Netherlands ............................ 8602404

[51] Int. Cl.$^4$ ................................................. C01B 3/36
[52] U.S. Cl. ................................. 48/197 R; 48/196 R; 165/134.1; 431/2; 431/6; 431/11; 432/4
[58] Field of Search ......... 252/373; 48/196 R, 196 A, 48/197 R; 431/2, 6, 11; 165/1, 134.1; 432/4, 31

[56] References Cited

U.S. PATENT DOCUMENTS

| 3,446,747 | 5/1969 | Bongiorno | 252/373 |
| 3,738,103 | 6/1973 | Rudolf et al. | 252/373 |
| 4,681,701 | 7/1987 | Sie | 252/373 |

OTHER PUBLICATIONS

The Thermochemical Recuperator System—Advanced Heat Recovery, by Donald K. Fleming and Mark J. Khinkis, Institute of Gas Technology; Presented at the 12th Energy Technology Conference and Exposition, Washington, D.C., Mar. 25-27, 1985.
Reliability, Efficiency, and Economics of Recuperators in Industrial Applications—J. Seehausen; Presented to the 1981 Gas Research Conference in Los Angeles.

*Primary Examiner*—Peter Kratz
*Attorney, Agent, or Firm*—Weingarten, Schurgin, Gagnebin & Hayes

[57] ABSTRACT

A method of carrying out a gas combustion process with recovery of the heat from the combustion gases, which comprises passing said gases during the stationary condition of the process through a recuperator in which a part of the heat released is used for heating the air required for the combustion, and then passing the gases through a reformer in which a part of the residual heat is used for converting fresh gas to be burned with steam, in which method at least during the non-stationary conditions of the process a cooling medium is supplied to the combustion gases before introducing them into the reforming reactor.

4 Claims, 3 Drawing Sheets

METHOD OF CARRYING OUT A GAS COMBUSTION PROCESS WITH RECOVERY OF A PART OF THE HEAT PRESENT IN THE COMBUSTION GASES

FIELD OF THE INVENTION

This invention relates to a method of carrying out a gas combustion process with recovery of a part of the heat present in the combustion gases.

BACKGROUND OF THE INVENTION

In a number of processes, such as glass melting, in the metallurgical industry etc., the thermal energy required is obtained by burning gaseous products or hydrocarbons particularly natural gas, that can be easily converted into gaseous products. The combustion products (flue gas) released in such processes still contain a substantial amount of thermal energy in the form of sensible heat.

It is known that a part of this heat can be recovered by using the flue gas for preheating the air required for the combustion process. For this purpose use is often made of a metal radiation recuperator (a heat exchanger in which heat is transferred by radiation). The degree in which heat can be recovered, however, is highly limited by the temperature maximally permitted by the metal of the recuperator. In practice, this means that the air required for the combustion cannot be preheated beyond a temperature of about 800° C. The temperature of the flue gas to be discharged to the chimney is still about 700° C.

In order to make better use of the residual heat of the flue gases, it has been proposed that the gas can be used to thermally convert a methane-containing (natural) gas mixture with steam. In a so-called thermochemical recuperator (reformer) heat is transferred from the flue gas to a reacting natural gas-steam mixture which is passed over a steam reforming catalyst at high temperature and is converted into a mixture of hydrogen, carbon monoxide and carbon dioxide. With this reactor much heat is absorbed which is released again in the combustion of the resulting gas mixture (compare "The Thermochemical Recuperator System, Advanced Heat Recovery" by Donald K. Fleming and Mark J. Khinkis, paper presented by the 12th Energy Technology Conference and Exposition, Washington, D.C., Mar. 25-27, 1985).

The heat of the flue gases leaving the reformer is then transferred, optionally, after an intermediate stage in which the gas/steam mixture is preheated, to a steam boiler in which the steam is generated for the reforming process.

Although the use of the recuperator/reformer combination may in principle lead to a substantial increase in thermal efficiency, its practical realization has not been possible because of the incontrollability of the process in its non-stationary phase. This also applies when a part of the flue gas is passed from the furnace to the chimney either directly or via the recuperator, quite apart from the accompanying economic losses.

The major causes of the above are that during the starting-up phase of the combustion furnace and therefore previous to the equilibrium or stationary phase in which relatively large amounts of heat are dissipated in the process system the heat content and the temperature of the flue gases are so high that the flue gases cannot be passed through the reformer and preheaters. During the starting-up phase the reformer is in fact not or still insufficiently cooled by the endothermic reforming reactions, so that it would be damaged by the occurring high temperature. Similar problems occur when the phases of the process which take place after the recuperator must be discontinued, e.g., for replacement of the catalyst in the reformer or because of other failures.

SUMMARY OF THE INVENTION

According to the invention it has been found that an excellent controllability of the process and therefore a good practical usability are obtained when a cooling medium is supplied to the flue gases before introducing them into the reformer, and preferably after they have passed the recuperator and the flue gas bypass.

In principle, any cooling medium, such as water, can be supplied to the flue gas. Preferably, however, air is used for the purpose. The amount of air to be supplied can be readily determined by means of the temperature of the flue gas leaving the combustion furnace, on the one hand, and the reformed gas temperature, on the other hand. This can be carried out using a known per se method by means of temperature sensors in the flue gas introduced into the reforming reactor and in the reformed gas leaving the reforming reactor, the signals of the sensors being used for controlling the amount of cooling medium. In this connection it has been established that supplying 10% air having ambient temperature, based on the total volume of the flue gas, will lead to a decrease of temperature of 100° C. The amount of air to be admixed depends on the place where it is admixed. Because air is preferably admixed after the recuperator and the gas bypass and the temperature of the gases introduced into the reforming reactor may be up to 1100° C., while it may not be higher than 700° C. during the non-stationary phase, the amount of air supplied to the flue gas is initially about 40%, based on the total gas volume, which amount will gradually decrease to 0% during the starting-up phase.

BRIEF DESCRIPTION OF THE DRAWINGS

The present invention will be more fully understood by referring to the following detailed description in conjunction with the accompanying drawings, of which.

DETAILED DESCRIPTION OF THE INVENTION

Figure 1:
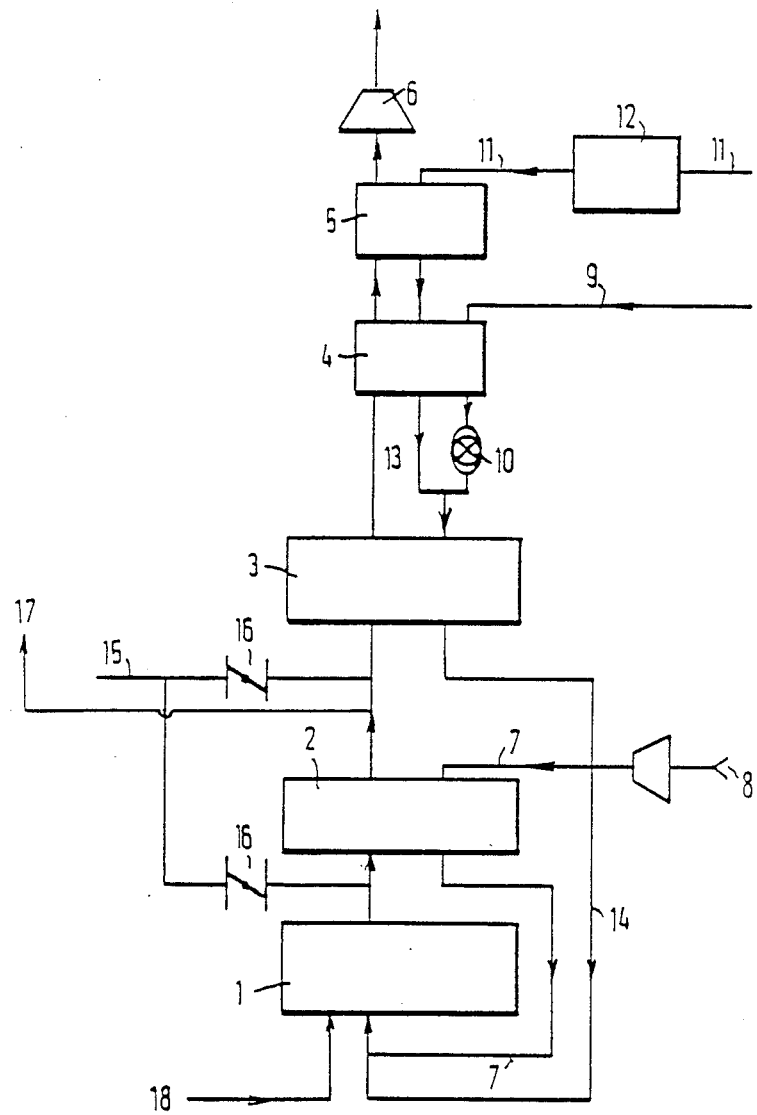
FIG. 1 is a schematic representation of the method of the invention.

The method according to the invention is schematically shown in FIG. 1. The combustion gas, e.g. having a temperature of 1300° C., flows from the furnace (1) and then traverses the air recuperator (2), the steam reformer (3), the gas/steam preheater (4) and is then passed via steam boiler (5) to the flue gas fan (6) and the chimney. At (17) a gas bypass conduit is indicated which generally branches from the flue gas conduit before the reformer. Combustion air is supplied via fan (8) through conduit (7) and an optionally present preheater, which is not shown, said combustion air being preheated in recuperator (2). The medium to be burned, especially natural gas, is supplied to the reformer (3) via conduit (9), the preheating section (4) and the desulfurizer (10). Water is supplied to steam boiler (5) via conduit (11), the demineralizing unit (12). Steam together with the gas flowing from the desulfurizer (10) is supplied to the reformer (3) via conduit (13). The gases flowing from the reformer are supplied to the combustion furnace via conduit (14). At (15) a conduit is shown which air or another cooling medium, such as water, can be supplied to the recuperator (2) or the reformer (3) by means of valves or taps (16). During the non-stationary phase of the process a hydrocarbon to be burned is supplied via conduit (18).

The invention will be illustrated by the following examples.

EXAMPLE I

On the basis of the data concerning respectively the normal operation and the starting-up of a glass furnace having a capacity of 400 tons of glass a day, this example shows the effect on the process variables of the addition of a cooling medium (air of water) to the flue gases.

The data are grouped in Table A. The temperature of the flue gas just before the recuperator is 1350° C. The alternative "0" indicated in the table is the condition in which the entire process, including the reforming reactions, is in the "steady state". In alternatives 1 through 6 the different possibilities of starting-up the entire process are indicated, i.e. starting from only the use of the recuperator to the realization of the entire process using the complete equipment. During the starting-up phase a relatively small part of the flue gases is passed through the reformer. The temperature of the flue gas entering the reformer is decreased from 1030° C. to about 700° C. by admixing air or water. This is necessary because during the starting-up phase the reformer and the preheater are not yet cooled by the gas/steam reaction, and the wall temperature of the reformer must not exceed a specific value. The table shows that during the starting-up phase a substantial part of the flue gas is passed directly to the chimney via the bypass. The reason for this is that the reactions in the reformer develop only slowly, so that the available heat content of the flue gas is so large that it cannot be passed entirely to the steam boiler. Once steam is produced, natural gas can be passed over the reformer. The initial amount must be low, while it can be increased slowly.

Alternatives 1 through 6 indicate the result for a bypass branching before (upstream of) or after (downstream of) the recuperator. As the results show, hardly more heat is transferred by the recuperator when air is admixed before the recuperator. This results in that the (natural) gas consumption is higher and that the chimney system must be much larger so as to enable the processing of the large amount of flue gas.

It further appears from the data that admixture of air after the gas bypass and after the recuperator leads to the most favorable results. Finally, it appears from the data that admixture of water, preferably after the gas bypass, leads to a smaller amount of flue gas than is obtained by admixture with air.

TABLE A

| Alternative | Different alternatives for cooling flue gas when switching over from TCR | | | | | | |
|---|---|---|---|---|---|---|---|
| | 0 | 1 | 2 | 3 | 4 | 5 | 6 |
| Branch bypass: | — | after recuperator | after recuperator | before recuperator | before recuperator | after recuperator | before recuperator |
| Medium admixed in flue gas | — | air | air | air | air | water | water |
| location admixture | — | before bypass | after bypass | before bypass | after bypass | after bypass | before bypass |
| flue gas temperature before recuperator (°C.) | 1350 | 1350 | 1350 | 724 | 724 | 1350 | 724 |
| flue gas temperature after recuperator (°C.) | 1083 | 1029 | 1029 | 700 | 700 | 1029 | 700 |
| air temperature before recuperator (°C.) | 350 | 40 | 40 | 40 | 40 | 40 | 40 |
| air temperature after recuperator (°C.) | 800 | 500 | 500 | 100 | 100 | 500 | 100 |
| amount of natural gas Kmol/h | 116 | 189 | 189 | 286 | 286 | 189 | 286 |
| amount of air to furnace (Kmol/h) | 1035 | 1703 | 1703 | 2577 | 2577 | 1703 | 2577 |
| amount of air/water to flue gas (Kmol/h) | 0 | 1192 | 260 | 3247 | 260 | 77 | 529 |
| amount of flue gas to reformer (Kmol/h) | 1432 | 690 | 690 | 690 | 690 | 507 | 507 |
| amount of flue gas via bypass (Kmol/h) | 0 | 2468 | 1536 | 5496 | 2409 | 1537 | 2960 |
| total amount of flue gas (Kmol/h) | 1432 | 3158 | 2227 | 6186 | 3099 | 2041 | 3464 |
| required power air blower (Kw) | 16 | 46 | 46 | 153 | 153 | 46 | 153 |
| Explanation TCR | stationary condition | | | starting-up the TCR | | | |

EXAMPLE II

Figure 2:
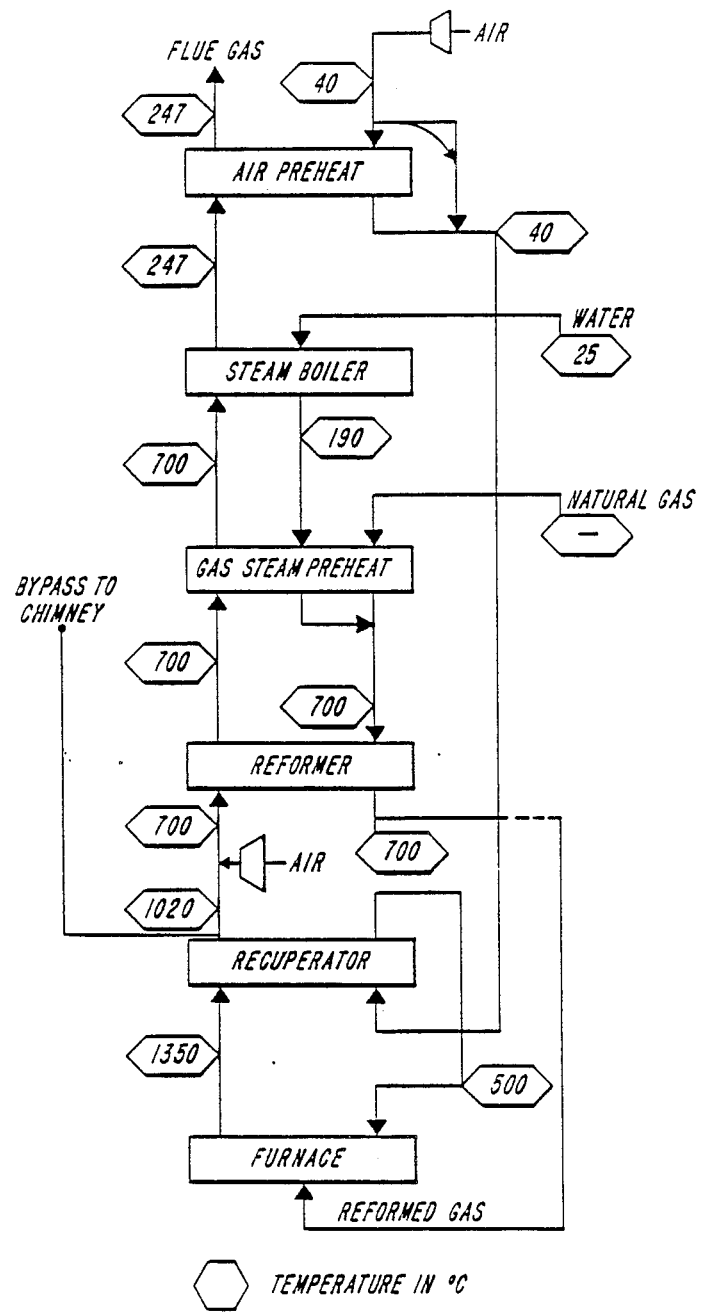
FIG. 2 is a schematic representation of the temperatures that occur during the "starting-up" phase of the method of the invention.

In this example the temperature in the different phases of the process during the starting-up phase of a glass furnace of 400 tons of glass a day is schematically indicated in FIG. 2.

| Composition of natural gas: (mol %) | |
|---|---|
| $CO_2$ | 0.89 |
| $CH_4$ | 81.34 |
| $N_2$ | 14.32 |
| $C_2$ | 2.89 |
| $C_3$ | 0.38 |
| $C_4$ | 0.18 |

Gas flow in Kmol/h:

Air: 1703 natural gas: 189 (direct to furnace, not via reformer)

Reformed gas: -steam: 208 (pressure build-up)

Air for admixture: 260

Flue gas to reformer: 690

Flue gas to bypass: 1536 total of flue gas: 2227

| Gas composition (mol %) | $H_2$ | $H_2O$ | CO | $CO_2$ | $CH_4$ | $N_2$ | $O_2$ |
|---|---|---|---|---|---|---|---|
| Reformed gas | — | — | — | — | — | | |
| Flue gas | | 18.3 | — | 11.9 | — | 68.8 | 1.0 |

| | power (Mw) |
|---|---|
| Air preheat | — |
| Steam boiler | 2.87 |
| Gas/steam preheat | — |
| Reformer | — |
| Recuperator | 6.62 |
| Furnace | 15.65 |

EXAMPLE III

Figure 3:
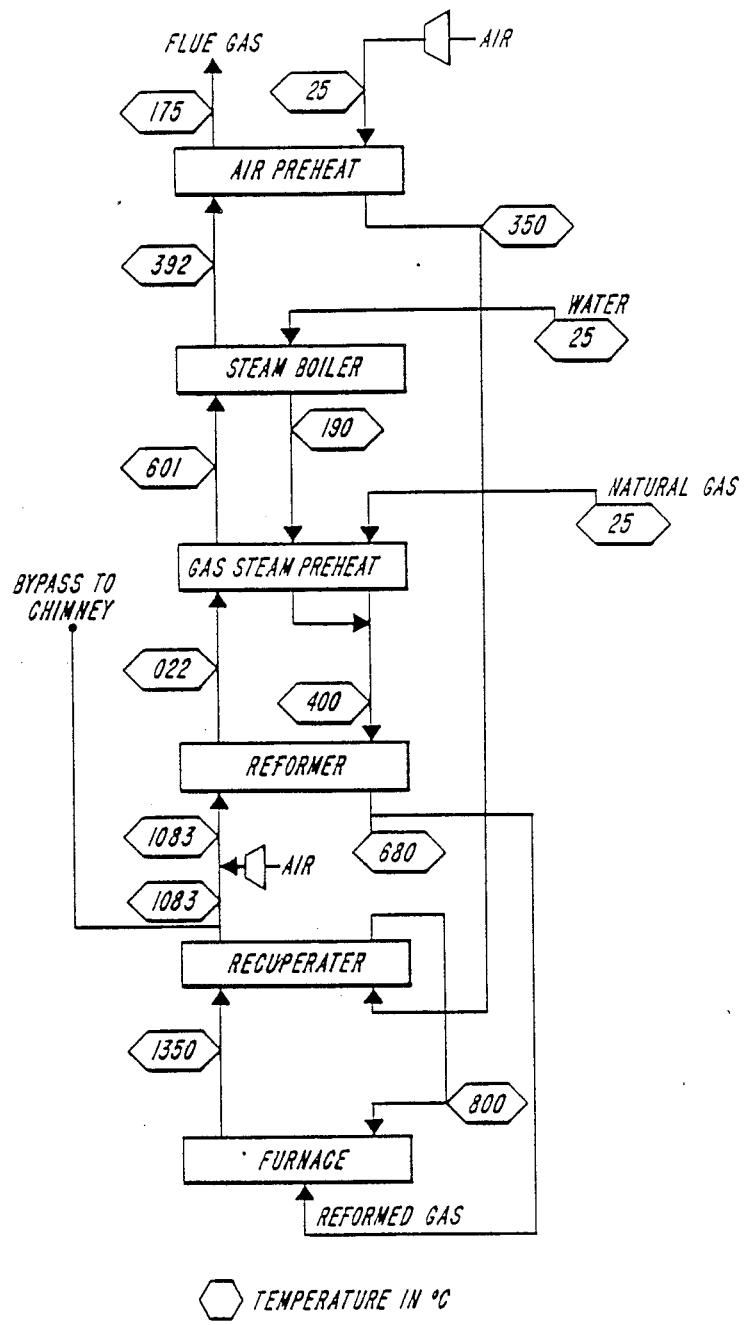
FIG. 3 is a schematic representation of the temperatures that occur during the "steady-state" phase of the method of the invention.

In this example the temperatures in the different phases of the process during the "steady state" phase of an operated glass furnace for 400 tons of glass a day are schematically indicated in FIG. 3.

Composition of natural gas: the same as in Example II.

Gas flows in Kmol/h:

Air: 1035 natural gas: 116

Reformed gas: 494 steam: 208

Air for admixture: 0

Flue gas to reformer: 1432

Flue gas to bypass: 0 total of flue gas: 1432

| Gas composition: (mol %) | $H_2$ | $H_2O$ | CO | $CO_2$ | $CH_4$ | $N_2$ | $O_2$ |
|---|---|---|---|---|---|---|---|
| Reformed gas | 56.7 | 18.8 | 10.9 | 6.5 | 3.8 | 3.4 | 0.6 |
| Flue gas | — | 30.2 | — | 11.7 | — | 57.4 | 0.7 |

| | Power (Mw) |
|---|---|
| Air preheat | 2.79 |
| Steam boiler | 2.87 |
| Gas/steam preheat | 1.00 |
| Reformer | 6.10 |
| Recuperator | 4.17 |
| Furnace | 15.65 |

Examples I and II show that the amount of air to be admixed can be readily adjusted—especially by determining the highest desired temperature during the different phases of the process—until the stationary condition has been reached and admixture of air to the flue gas is no longer necessary.

What I claim:

1. A method of carrying out a gas combustion process having stationary and non-stationary conditions in a combustion chamber to which gas and air are supplied wherein heat from flue gas generated during the combustion process is recovered, comprising the steps of:

extracting heat from the flue gas by passing the flue gas through a recuperator;

heating the air supplied to the combustion chamber with the extracted heat;

extracting further heat from the flue gas by passing the flue gas through a reformer;

converting in said reformer, with said further extracted heat, a combustible gas and steam into a resulting gas to be supplied to the combustion chamber for use in combustion; and supplying, during non-stationary conditions of the combustion process, a cooling medium to the flue gas before passing the flue gas through said reformer.

2. The method of claim 1, wherein said cooling medium is supplied prior to said reformer after the flue gas has passed through said recuperator and passed any flue gas bypass.

3. The method of claim 1, wherein air is used as said cooling medium.

4. The method of claim 2, wherein said cooling medium is comprised of 10 to 40% air at ambient temperature, based upon total gas volume.

* * * * *

UNITED STATES PATENT AND TRADEMARK OFFICE
CERTIFICATE OF CORRECTION

PATENT NO. : 4,900,333

DATED : February 13, 1990

INVENTOR(S) : Hugo T. Bos

It is certified that error appears in the above-identified patent and that said Letters Patent is hereby corrected as shown below:

In Column 1, line 34, "flue gases" should read --flue gas--.

In Column 1, line 49, "flue gases" should read --flue gas--.

In Column 3, line 52, "gases" should read --gas--.

In Column 3, line 62, "flue gases" should read --flue gas--.

Signed and Sealed this

Twenty-first Day of April, 1992

Attest:

HARRY F. MANBECK, JR.

*Attesting Officer*     *Commissioner of Patents and Trademarks*